US008651146B2

(12) United States Patent
Johnson et al.

(10) Patent No.: US 8,651,146 B2
(45) Date of Patent: Feb. 18, 2014

(54) CABLE STAND-OFF

(75) Inventors: Kristin D. Johnson, Louisville, CO (US); Joseph E. Hendricks, Longmont, CO (US); Darion Peterson, Boulder, CO (US); Christopher T. Rusin, Minneapolis, MN (US); Kevin J. Seifert, Concord, MA (US); Arnold V. DeCarlo, Frederick, CO (US)

(73) Assignee: Covidien LP, Mansfield, MA (US)

( * ) Notice: Subject to any disclaimer, the term of this patent is extended or adjusted under 35 U.S.C. 154(b) by 918 days.

(21) Appl. No.: 12/240,091

(22) Filed: Sep. 29, 2008

(65) Prior Publication Data

US 2009/0084581 A1 Apr. 2, 2009

Related U.S. Application Data

(60) Provisional application No. 60/975,891, filed on Sep. 28, 2007.

(51) Int. Cl.
*F16L 3/00* (2006.01)

(52) U.S. Cl.
USPC .............. 138/106; 138/108; 138/112; 248/55

(58) Field of Classification Search
USPC ............................. 138/106, 108, 112; 248/55
See application file for complete search history.

(56) References Cited

U.S. PATENT DOCUMENTS 732,582 A * 6/1903 McKay ........................... 248/75
2,915,089 A * 12/1959 Horsting, Sr. ................. 138/113
2,959,632 A * 11/1960 Peterson ..................... 174/40 R
3,383,875 A * 5/1968 Haas .............................. 62/50.7
3,473,575 A * 10/1969 Vogelsang et al. ............ 138/149
3,595,982 A * 7/1971 Kafka .......................... 174/15.5
3,619,474 A * 11/1971 Beck ............................... 174/19
4,121,623 A * 10/1978 Rhone ........................... 138/114
4,140,130 A 2/1979 Storm, III (Continued)

FOREIGN PATENT DOCUMENTS

EP 0 521 264 1/1993
EP 0 667 126 8/1995

(Continued)

OTHER PUBLICATIONS

I Chou, C.K., "Radiofrequency Hyperthermia in Cancer Therapy," Biologic Effects of Nonionizing Electromagnetic Fields, Chapter 94, CRC Press, Inc., (1995), pp. 1424-1428.

(Continued)

*Primary Examiner* — James Hook

(57) ABSTRACT

The different embodiments of the cable stand-off serve as a thermally inslutative protector. In one embodiment, the cable stand-off includes an elongated member defining a lumen therethrough, and a plurality of fins extending from an outer surface of the elongated member, wherein the plurality of fins includes sets of fins, each set of fins being spaced a longitudinal distance from one another and being positioned around a circumference of the elongated member. Another embodiment of the cable stand-off comprises an elongated member having a helical shape and surrounding at least a portion of a length of at least one energy transmission conduit. In yet another embodiment, a cable stand-off comprises an elongated surrounding at least a portion of a length of an energy transmission conduit, wherein the elongated member is made of a non-flammable, low particulate, flexible fiber material.

8 Claims, 8 Drawing Sheets

(56) References Cited

U.S. PATENT DOCUMENTS 4,311,154 A 1/1982 Sterzer et al.
4,409,993 A 10/1983 Furihata
4,440,154 A * 4/1984 Bellows ........................ 126/694
4,534,347 A 8/1985 Taylor
4,557,272 A 12/1985 Carr
4,583,869 A 4/1986 Chive et al.
4,612,940 A 9/1986 Kasevich et al.
4,621,642 A 11/1986 Chen
4,658,836 A 4/1987 Turner
4,700,716 A 10/1987 Kasevich et al.
4,776,086 A 10/1988 Kasevich et al.
4,800,899 A 1/1989 Elliott
4,823,812 A 4/1989 Eshel et al.
4,841,988 A 6/1989 Fetter et al.
4,945,912 A 8/1990 Langberg
5,097,845 A 3/1992 Fetter et al.
5,122,137 A 6/1992 Lennox
5,190,054 A 3/1993 Fetter et al.
5,221,269 A 6/1993 Miller et al.
5,234,004 A 8/1993 Hascoet et al.
5,246,438 A 9/1993 Langberg
5,249,585 A 10/1993 Turner et al.
5,275,597 A 1/1994 Higgins et al.
5,281,217 A 1/1994 Edwards et al.
5,301,687 A 4/1994 Wong et al.
5,314,466 A 5/1994 Stern et al.
5,342,355 A 8/1994 Long
5,344,441 A 9/1994 Gronauer
5,366,490 A 11/1994 Edwards et al.
5,370,644 A 12/1994 Langberg
5,383,922 A 1/1995 Zipes et al.
5,405,346 A 4/1995 Gundy et al.
5,413,588 A 5/1995 Rudie et al.
5,458,597 A 10/1995 Edwards et al.
5,464,445 A 11/1995 Rudie et al.
5,480,417 A 1/1996 Hascoet et al.
5,500,012 A 3/1996 Brucker et al.
5,507,743 A 4/1996 Edwards et al.
5,509,929 A 4/1996 Hascoet et al.
5,520,684 A 5/1996 Imran
5,536,267 A 7/1996 Edwards et al.
5,545,137 A 8/1996 Rudie et al.
5,556,377 A 9/1996 Rosen et al.
5,599,294 A 2/1997 Edwards et al.
5,599,295 A 2/1997 Rosen et al.
5,628,770 A 5/1997 Thome et al.
5,683,382 A 11/1997 Lenihan et al.
5,720,718 A 2/1998 Rosen et al.
5,741,249 A 4/1998 Moss et al.
5,755,754 A 5/1998 Rudie et al.
5,776,176 A 7/1998 Rudie
5,800,486 A 9/1998 Thome et al.
5,810,803 A 9/1998 Moss et al.
5,810,804 A 9/1998 Gough et al.
5,829,519 A 11/1998 Uthe
5,843,144 A 12/1998 Rudie et al.
5,871,523 A 2/1999 Fleischman et al.
5,897,554 A 4/1999 Chia et al.
5,902,251 A 5/1999 vanHooydonk
5,904,691 A 5/1999 Barnett et al.
5,904,709 A 5/1999 Arndt et al.
5,916,240 A 6/1999 Rudie et al.
5,931,807 A 8/1999 McClure et al.
5,938,692 A 8/1999 Rudie
5,951,547 A 9/1999 Gough et al.
5,957,969 A 9/1999 Warner et al.
5,964,755 A 10/1999 Edwards
5,974,343 A 10/1999 Brevard et al.
5,980,563 A 11/1999 Tu et al.
5,997,532 A 12/1999 McLaughlin et al.
6,016,811 A 1/2000 Knopp et al.
6,026,331 A 2/2000 Feldberg et al.
6,032,078 A 2/2000 Rudie
6,047,216 A 4/2000 Carl et al.
6,056,744 A 5/2000 Edwards
6,059,780 A 5/2000 Gough et al.
6,063,078 A 5/2000 Wittkampf
6,073,051 A 6/2000 Sharkey et al.
6,080,150 A 6/2000 Gough
6,097,985 A 8/2000 Kasevich et al.
6,106,518 A 8/2000 Wittenberger et al.
6,122,551 A 9/2000 Rudie et al.
6,134,476 A 10/2000 Arndt et al.
6,146,379 A 11/2000 Fleischman et al.
6,176,856 B1 1/2001 Jandak et al.
6,181,970 B1 1/2001 Kasevich
6,186,181 B1 * 2/2001 Schippl ......................... 138/112
6,217,528 B1 4/2001 Koblish et al.
6,223,086 B1 4/2001 Carl et al.
6,226,553 B1 5/2001 Carl et al.
6,233,490 B1 5/2001 Kasevich
6,235,048 B1 5/2001 Dobak, III
6,245,064 B1 6/2001 Lesh et al.
6,251,128 B1 6/2001 Knopp et al.
6,275,738 B1 8/2001 Kasevich et al.
6,277,113 B1 8/2001 Berube
6,289,249 B1 9/2001 Arndt et al.
6,290,715 B1 9/2001 Sharkey et al.
6,306,132 B1 10/2001 Moorman et al.
6,325,796 B1 12/2001 Berube et al.
6,330,479 B1 12/2001 Stauffer
6,346,104 B2 2/2002 Daly et al.
6,347,251 B1 2/2002 Deng
6,350,262 B1 2/2002 Ashley
6,355,033 B1 3/2002 Moorman et al.
6,383,182 B1 5/2002 Berube et al.
6,405,733 B1 6/2002 Fogarty et al.
6,471,696 B1 10/2002 Berube et al.
6,496,737 B2 12/2002 Rudie et al.
6,496,738 B2 12/2002 Carr
6,512,956 B2 1/2003 Arndt et al.
6,514,251 B1 2/2003 Ni et al.
6,530,922 B2 3/2003 Cosman et al.
6,557,589 B2 * 5/2003 Bozic et al. ................... 138/106
6,564,806 B1 5/2003 Fogarty et al.
6,569,159 B1 5/2003 Edwards et al.
6,589,234 B2 7/2003 Lalonde et al.
6,592,579 B2 7/2003 Arndt et al.
6,663,624 B2 12/2003 Edwards et al.
6,675,050 B2 1/2004 Arndt et al.
6,685,700 B2 2/2004 Behl et al.
6,699,241 B2 3/2004 Rappaport et al.
6,706,040 B2 3/2004 Mahon et al.
6,722,371 B1 4/2004 Fogarty et al.
6,752,154 B2 6/2004 Fogarty et al.
6,752,767 B2 6/2004 Turovskiy et al.
6,823,218 B2 11/2004 Berube
6,852,091 B2 2/2005 Edwards et al.
6,878,147 B2 4/2005 Prakash et al.
7,077,165 B2 * 7/2006 Takasaki et al. .............. 138/108
7,128,739 B2 10/2006 Prakash et al.
7,147,632 B2 12/2006 Prakash et al.
7,555,349 B2 * 6/2009 Wessman et al. ............. 607/116
2001/0001819 A1 5/2001 Lee et al.
2001/0008966 A1 7/2001 Arndt et al.
2001/0020178 A1 9/2001 Arndt et al.
2001/0020180 A1 9/2001 Arndt et al.
2001/0037812 A1 11/2001 Dobak, III et al.
2002/0022832 A1 2/2002 Mikus et al.
2002/0087151 A1 7/2002 Mody et al.
2002/0133148 A1 9/2002 Daniel et al.
2002/0147444 A1 10/2002 Shah et al.
2002/0198520 A1 12/2002 Coen et al.
2003/0004506 A1 1/2003 Messing
2003/0065317 A1 4/2003 Rudie et al.
2003/0069578 A1 4/2003 Hall et al.
2003/0078573 A1 4/2003 Truckai et al.
2003/0088242 A1 5/2003 Prakash et al.
2003/0109862 A1 6/2003 Prakash et al.
2003/0195499 A1 10/2003 Prakash et al.
2003/0233091 A1 * 12/2003 Whayne et al. ................. 606/49
2004/0078038 A1 4/2004 Desinger et al.
2004/0167517 A1 8/2004 Desinger et al.
2004/0168692 A1 9/2004 Fogarty et al.

(56) References Cited

U.S. PATENT DOCUMENTS

| | | | | |
|---|---|---|---|---|
| 2004/0243200 | A1 | 12/2004 | Turner et al. | |
| 2004/0267156 | A1 | 12/2004 | Turovskiy et al. | |
| 2005/0015081 | A1 | 1/2005 | Turovskiy et al. | |
| 2005/0065508 | A1 | 3/2005 | Johnson et al. | |
| 2005/0085881 | A1 | 4/2005 | Prakash et al. | |
| 2005/0107783 | A1 | 5/2005 | Tom et al. | |
| 2005/0148836 | A1 | 7/2005 | Kleen et al. | |
| 2005/0159741 | A1 | 7/2005 | Paul et al. | |
| 2006/0196568 | A1 * | 9/2006 | Leeser et al. | 138/149 |
| 2006/0259024 | A1 | 11/2006 | Turovskiy et al. | |
| 2006/0264923 | A1 | 11/2006 | Prakash et al. | |
| 2006/0282069 | A1 | 12/2006 | Prakash et al. | |
| 2007/0079884 | A1 * | 4/2007 | Tomerlin et al. | 138/112 |
| 2008/0275438 | A1 | 11/2008 | Gadsby et al. | |

FOREIGN PATENT DOCUMENTS

| | | |
|---|---|---|
| WO | WO 93/20767 | 10/1993 |
| WO | WO 93/20768 A1 | 10/1993 |
| WO | WO 96/34571 | 11/1996 |
| WO | WO 97/48449 | 12/1997 |
| WO | WO 97/48450 | 12/1997 |
| WO | WO 97/48451 | 12/1997 |
| WO | WO 99/56642 | 11/1999 |
| WO | WO 99/56643 | 11/1999 |
| WO | WO 99/56812 | 11/1999 |
| WO | WO 00/49957 | 8/2000 |
| WO | WO 00/57811 | 10/2000 |
| WO | WO 01/60235 | 8/2001 |
| WO | WO 02/078777 | 10/2002 |
| WO | WO 03/034932 | 5/2003 |
| WO | WO 03/039385 | 5/2003 |
| WO | WO 03/047043 A1 | 6/2003 |
| WO | WO 03/088806 | 10/2003 |
| WO | WO 03/088858 | 10/2003 |
| WO | WO 2005/011049 | 2/2005 |

OTHER PUBLICATIONS

Urologix, Inc./Medical Professionals: Targis3 Technology http://www.urologix.com/medical/technology.html, Apr. 27, 2001 (total p. 3).

International Search Report—EP 06 00 9435 dated Jul. 13, 2006.

US 5,326,343, 07/1994, Rudie et al. (withdrawn)

* cited by examiner

CABLE STAND-OFF

CROSS-REFERENCE TO RELATED APPLICATION

The present application claims priority to, and the benefit of, U.S. Provisional Patent Application Ser. No. 60/975,891, filed on Sep. 28, 2007, the entire contents of which are hereby incorporated by reference.

BACKGROUND

1. Technical Field

The present disclosure relates to a device and method for separating and cooling energy transmission conduits from other objects. More particularly, the present disclosure relates to cable stand-offs configured to isolate energy transmission conduits of electrosurgical systems.

2. Background of Related Art

Electrosurgical systems are well known in the art. Some electrosurgical systems employ radiofrequency and microwave energy to produce a number of therapeutic effects in and/or on tissue at a target surgical site during any number of non-specific surgical procedures. Many electrosurgical systems transmit microwave energy as well as other kinds of energy through conduits including wires, cables, tubing or other energy transmission devices. Generally, the energy transmitted through the conduits of these electrosurgical systems produces unwanted heat build-up in such conduits. To address this heat build-up and other related issues, many insulators, stand-offs and the like have been devised.

For instance, one electrical insulator, used in conjunction with energy transmitting conduits, includes a laminated tube. The laminated tube serves as a support for a cover made of elastomeric material. The cover is comprised of a plurality of annular fins. Further, the laminated tube has circular and helical groves.

A second type of electrical insulator comprises a body including holes for receiving heater wires, and a plurality of radially projecting points or ribs extruding therefrom. The points or ribs are dimensioned so that the outside of the body of the electrical insulator may be disposed into a cathode sleeve and will be centered in said sleeve.

SUMMARY

The present disclosure relates to a cable stand-off. An embodiment of the cable stand-off includes an elongated member defining a lumen therethrough and a plurality of fins extending from an outer surface of the elongated member. The elongated member is configured to receive at least one energy transmission conduit therein and is made of a thermally insulative material. The plurality of fins are arranged in sets of fins longitudinally spaced apart from one another. Each set of fins is disposed around an outer periphery of the elongated member. In one embodiment, the elongated member extends along a portion of a length of the conduit. In one particular embodiment, the elongated member extends along an entire length of the conduit. The cable stand-off may additionally include a plurality of elongated members supported on the conduit. These elongated members are longitudinally spaced apart from one another. In yet another embodiment, each fin extends radially away from a respective elongated member. At least one of the fins has a rectangular cross-section or any other suitable shape.

In another embodiment of the present disclosure, the cable stand-off includes an elongated member. At least a portion of the elongate member has a helical shape. The elongated member surrounds at least a portion of a length of at least one energy transmission conduit. In this embedment, the elongated member is formed of thermally insulative material. In one embodiment, the elongated member extends at least a portion of a length of the conduit. An embodiment of the presently disclosed cable stand-off has an elongated member extending along substantially an entire length of the conduit. In another embodiment, the elongated member includes helical segments jointed to one another by bridges. These helical segements may be longitudinally spaced apart from one another. In an embodiment, at least one of the bridges extends longitudinally between adjacent helical segements.

The present disclosure also describes another embodiment of the cable stand-off. This embodiment includes an elongated member surrounding at least a portion of a length of an energy transmission conduit. The elongated member is made of a non-flammable, low particulate, flexible fiber material. This material exhibits low thermal conductivity. In one embodiment, the elongated member extends along at least a portion of a length of the conduit. In another embodiment, the elongated member extends along an entire length of the conduit. The elongated member may include a woven or mesh sleeve. The low thermal conductivity material may include synthetic or natural fiber. In addition, the low thermal conductivity material may include fiberglass or polymer-based fiber. The material with low thermal conductivity may have an a bi-directional or unidirectional arrangement

BRIEF DESCRIPTION OF THE DRAWINGS

Embodiments of the present disclosure are disclosed herein with reference to the accompanying drawings, wherein.

DETAILED DESCRIPTION OF THE EMBODIMENTS

Embodiments of the presently disclosed cable stand-off are now described in detail or corresponding elements in each of the several views. Terms such as "above", "below", "forward", "rearward", etc. refer to the orientation of the figures or the direction of components and are simply used for convenience of description.

During invasive treatment of diseased areas of tissue in a patient, the insertion and placement of an electrosurgical energy delivery apparatus, such as an RF or a microwave ablation device, relative to the diseased area of tissue is important for successful treatment. Generally, electrosurgical energy delivery apparatuses employ energy to produce a plurality of therapeutic effects in tissue at a target surgical site during any number of non-specific surgical procedures. Such apparatuses usually include conduits in the form of a cable, wire, tubing or other elongated member suitable for transmitting energy. The energy transmitted through the conduit generally heats the conduit and may result in heat transfer to the adjacent environment, structure, and individuals. The devices hereinbelow described allow for cooling, separation and/or isolation of the heated conduits from users and patients.

Figure 1:
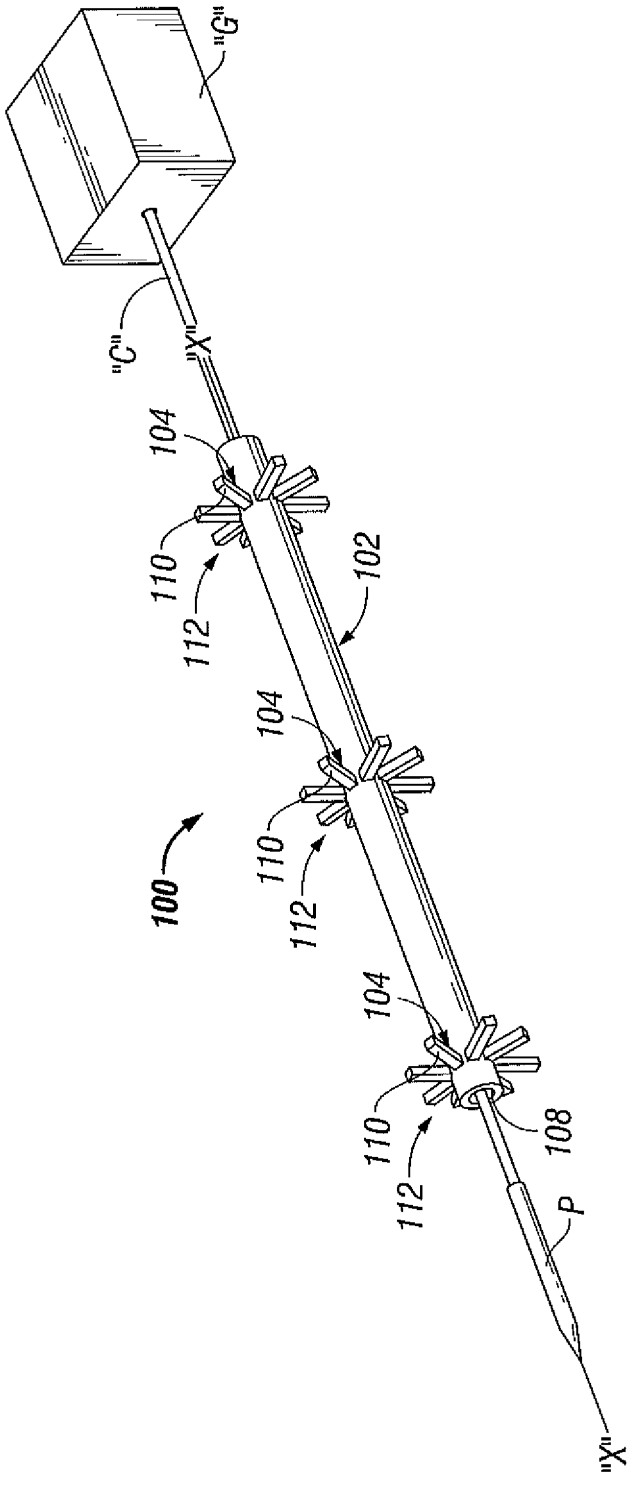
FIG. 1 is a perspective view of a cable stand-off according to an embodiment of the present disclosure.
Figure 2:
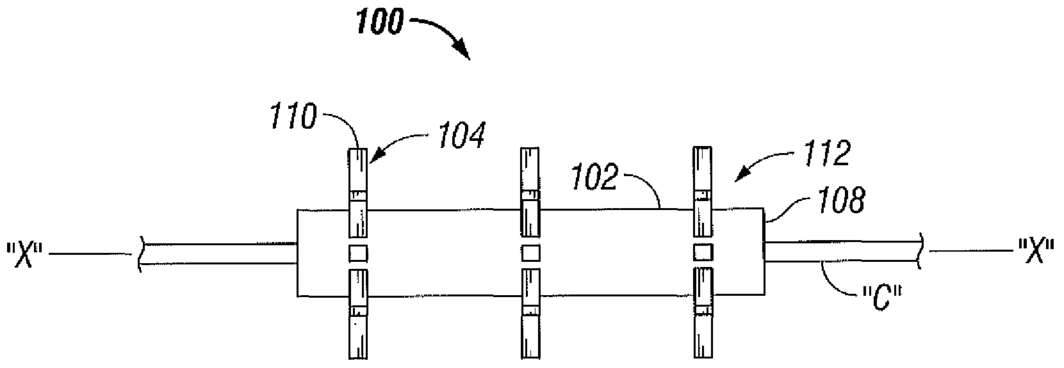
FIG. 2 is a side elevational view of the cable stand-off of FIG. 1.
Figure 3:
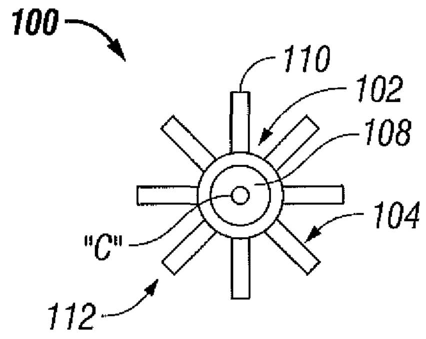
FIG. 3 is an elevational end view of the cable stand-off of FIGS. 1 and 2.

A cable stand-off in accordance with an embodiment of the present disclosure is generally referred to in FIGS. 1-5 as reference numeral 100. Referring initially to FIGS. 1-3, cable stand-off 100 includes an elongated member 102 having a plurality of raised profile 104 extending therefrom. Elongated member 102 defines a lumen 108 therethrough and a longitudinal axis "X". Additionally, elongated member 102 of cable stand-off 100 may be made of any suitable material, such as one exhibiting low thermal conductivity. Lumen 108 of member 102 is configured for receiving at least one conduit, in the form of a cable, a wire or a tubing "C". Conduit "C" transmits energy from an energy generator "G" to a probe "P". Energy generator "G," which may be any suitable generator operable to supply any suitable form of energy, supplies energy to probe "P". In turn, probe "P" emits, emanates, or radiates such energy at a specific surgical site.

As seen in FIGS. 1-3, each raised profile 104 may be in the form a fin 110. Fins 110 may be extruded from an outer surface of elongated member 102 and/or affixed (e.g., welded) to the outer surface of elongated member 102, using any suitable technique. In one embodiment, each fin 110 extends in a substantially radial direction away from elongated member 102; however, fins 110 may extend outwardly from elongated member 102 in any suitable direction. Each fin 110 may have a substantially rectangular transverse cross-section profile or a cuboid shape, albeit one skilled in the art will recognize that fin 110 may have any suitable shape of transverse cross-sectional profile. Fins 110 may be positioned around the circumference of elongated member 102 in a manner that will enhance cooling or heat transfer to/away from conduit "C".

As depicted in FIGS. 1-3, cable stand-off 100 may have sets 112 of fins 110 located at different locations along a length of elongated member 102. Each set 112 of fins includes a plurality of fins 110 disposed around the outer circumference of elongated member 102. A person with ordinary skills in the art will understand that cable stand-off 100 may have any number of sets 112 of fins 110 disposed around the circumference of elongated member 102 or a continuous set of fins 110 extending along the entire length of cable stand-off 100.

Figure 4:
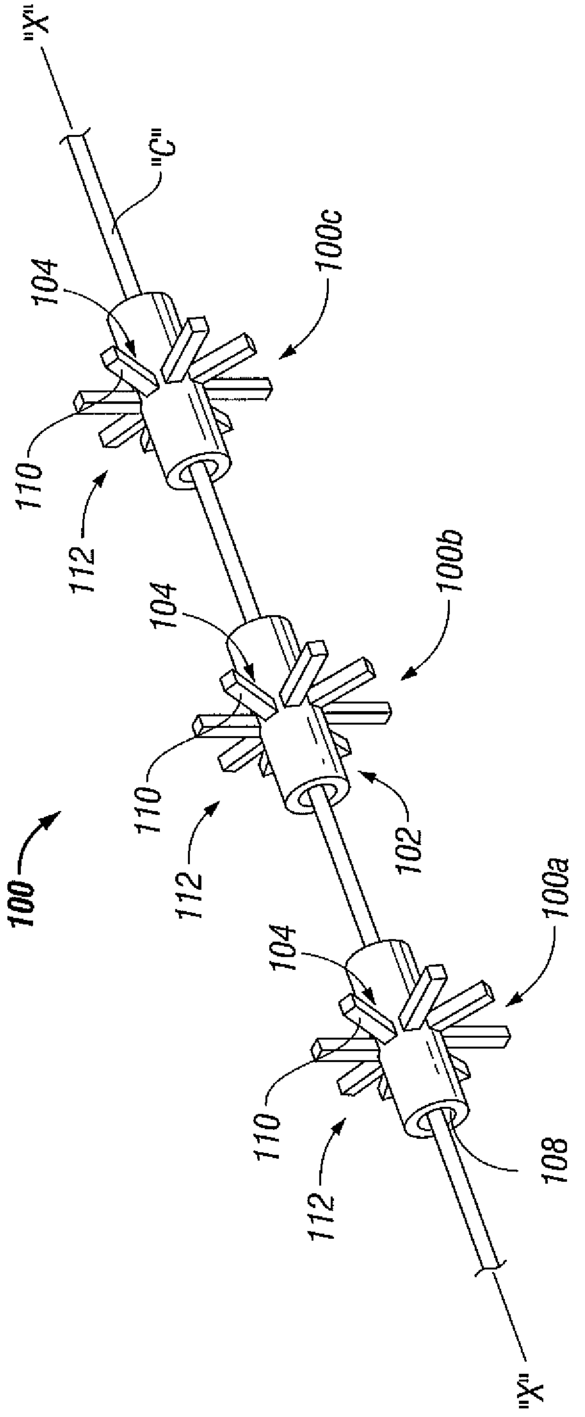
FIG. 4 is a perspective view of cable stand-off according to another embodiment of the present disclosure.
Figure 5:
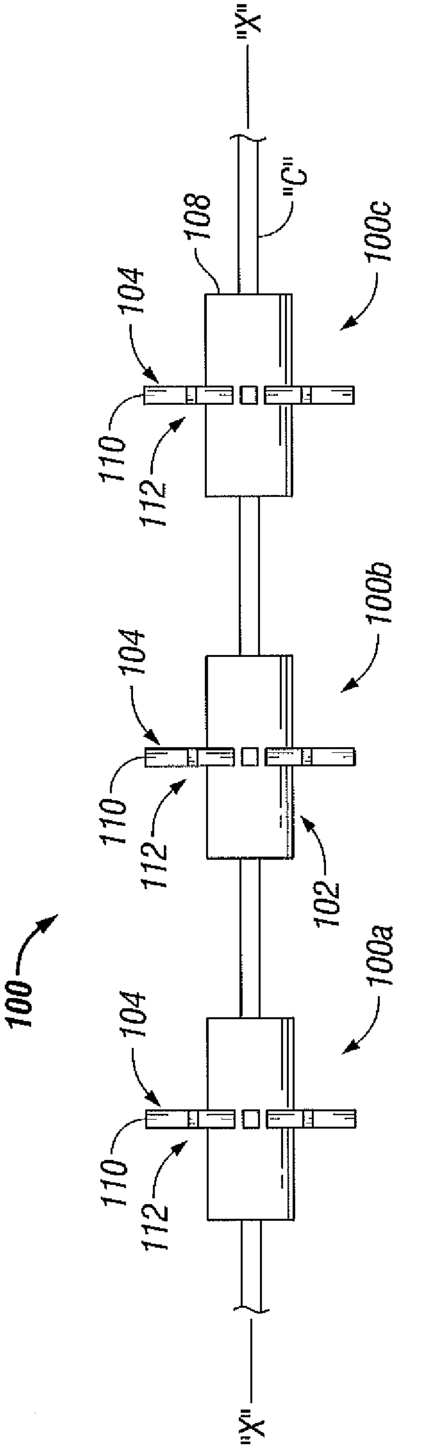
FIG. 5 is a side elevational view of the cable stand-off of FIG. 4.

In one embodiment, cable stand-off 100 may extend along substantially the entire length of conduit "C". Alternatively, as seen in FIGS. 4 and 5, cable stand-off 100 may be comprised of several sections 100*a*, 100*b*, 100*c*, etc. partially covering a portion of the length of conduit "C". The configuration of the latter embodiment allows heat to escape from the uncovered sections of cable 106.

In use, raised profile 104 of cable stand-off 100 increases the cooling area of cable stand-off 100, thereby increasing the convective cooling of conduit "C". Additionally, raised profile 104 effectively separates conduit "C" from users and patients and from adjacent conduits and the like. Cable stand-off 100 may be configured to be used with microwave ablation devices, RF ablation devices, or in combination with any other medical device having conduits transmitting electrosurgical energy.

Figure 6:
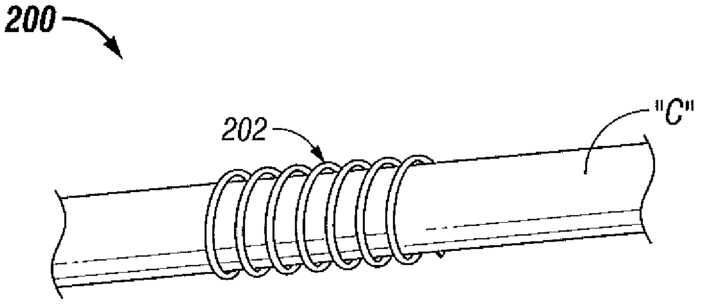
FIG. 6 is a perspective view of a cable stand-off according to yet another embodiment of the present disclosure.
Figure 7:
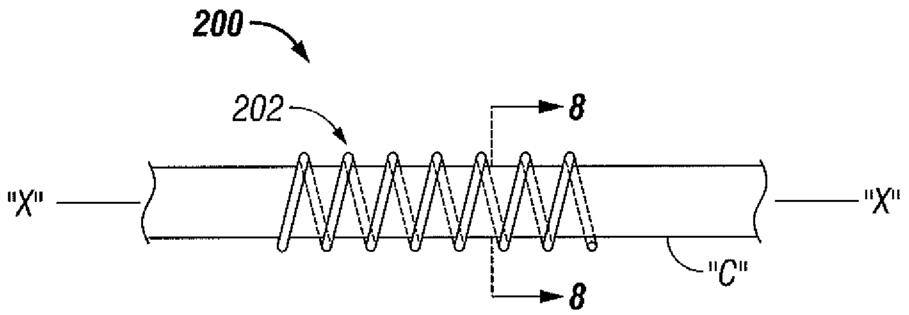
FIG. 7 is a side elevational view of the cable stand-off of FIG. 6.
Figure 8:
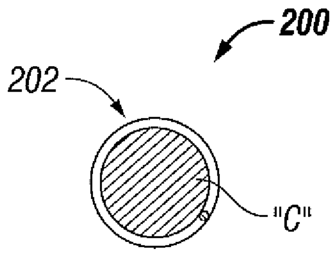
FIG. 8 is a transverse cross-sectional view of the cable stand-off of FIGS. 6 and 7, as taken through 8-8 of FIG. 7.

Turning now to FIGS. 6-8, an alternative embodiment of a cable stand-off is generally designated as 200. Cable stand-off 200 includes an elongated member 202 having a helical shape and is configured to separate conduit "C" from a user or a patient. In the illustrated embodiment, elongated member 202 has a circular transverse cross-sectional profile; however, elongated member 102 may have any suitable transverse cross-sectional profile.

Cable stand-off 200 may be formed of a suitable thermally insulative material, such as for example cardboard or paper. Further, cable stand-off 200 may be configured for enhancing heat transfer along conduit "C" by facilitating convective cooling throughout the entire length of conduit "C". In other embodiments, cable stand-off 200 is formed from an electrically and thermally insulative material.

Figure 9:
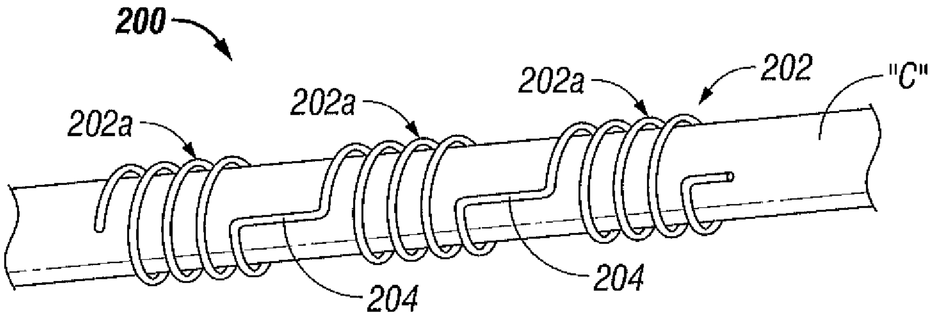
FIG. 9 is a perspective view of the cable stand-off according to a further embodiment of the present disclosure.
Figure 10:
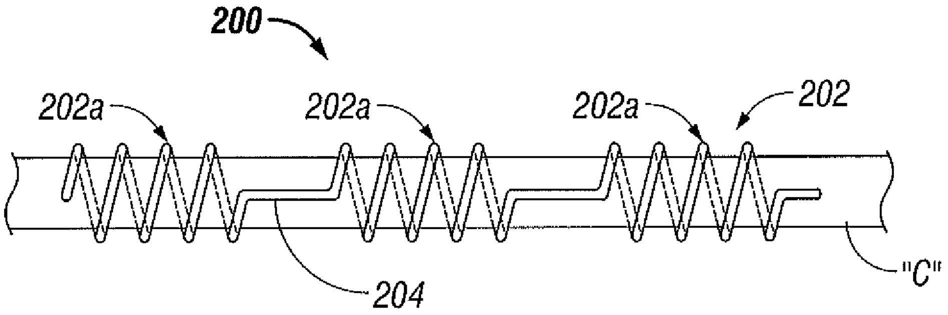
FIG. 10 is a side elevational view of the cable stand-off of FIG. 9.

Turning now to FIGS. 9 and 10, in an alternative embodiment, cable stand-off 200 comprises an elongated member 202 partially surrounding conduit "C". In this embodiment, elongated member 202 includes a plurality of helical shaped segments 202*a* surrounding segments of conduit "C". Each segment 202*a* of elongated member 202 is joined to an adjacent segment 202*a* by a bridge 204. Each bridge 204 extends longitudinally between adjacent helical segments 202*a*. This configuration allows conduit "C" to emit, emanate or radiate heat therefrom between segments 202*a*. In addition, airflow may convectively cool conduit "C" at locations between segments 202*a*.

In use, cable stand-off 200 isolates conduit "C", thereby preventing contact between conduit "C" and a user or patient. Cable stand-off 200 may also serve as a cable management system separating conduit "C" from other cables, wires or tubes.

Figure 11:
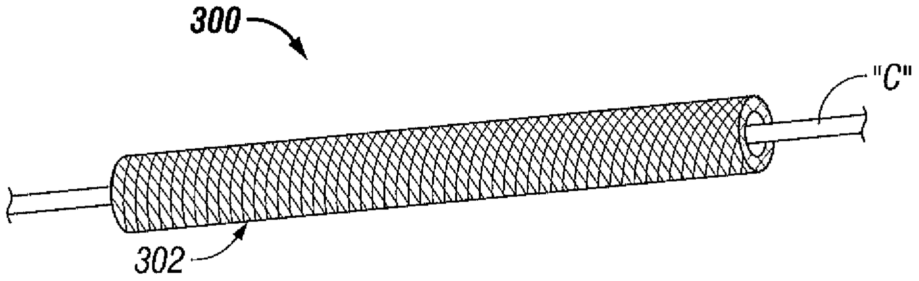
FIG. 11 is a perspective view of a cable stand-off according to another embodiment of the present disclosure.
Figure 12:
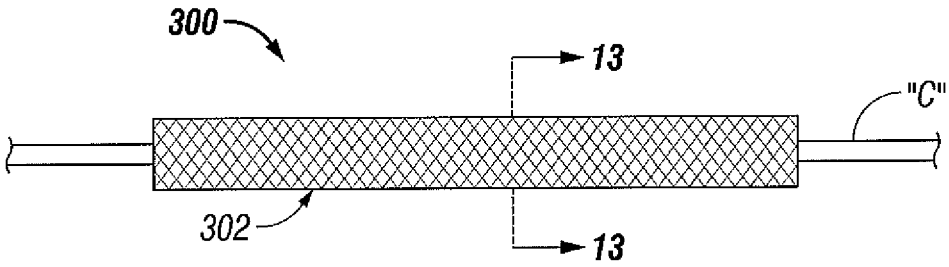
FIG. 12 is a side elevational view of the cable stand-off of FIG. 11.
Figure 13:
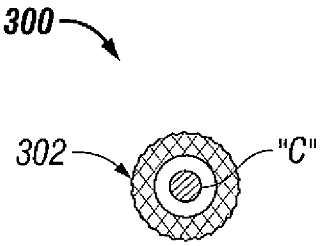
FIG. 13 is a transverse cross-sectional view of the cable stand-off of FIGS. 11 and 12, as taken through 13-13 of FIG. 12.

Turning now to FIGS. 11-13, an alternative embodiment of a cable stand-off is generally designated as 300. Cable stand-off 300 includes an elongated member 302 in the form of a woven or mesh sleeve. As seen in FIGS. 11-13, elongated member 302 extends along at least a substantial length of conduit "C". Elongated member 302 may be formed of any suitable insulative natural or synthetic fiber, though one skilled in the art will recognize that any suitable insulative material may be utilized. In addition, elongated member 302 may be comprised of a suitable non-flammable, low particulate, and flexible fiber. It is contemplated that the fiber of elongated member 302 should exhibit low thermal conductivity. For example, elongated member 302 may be made of any suitable fiberglass or polymer-based fiber material. These materials may be bi-directional or uni-directional.

In use, elongated member 302 of cable stand-off 300 separates conduit "C" from users and patients, and from adjacent conduits and the like. In addition, airflow may circulate through the cross-sectional area of elongated member 302 and convectively cool conduit "C". Users may stretch elongated member 302 and position it over structures contiguous to conduit "C".

Figure 14:
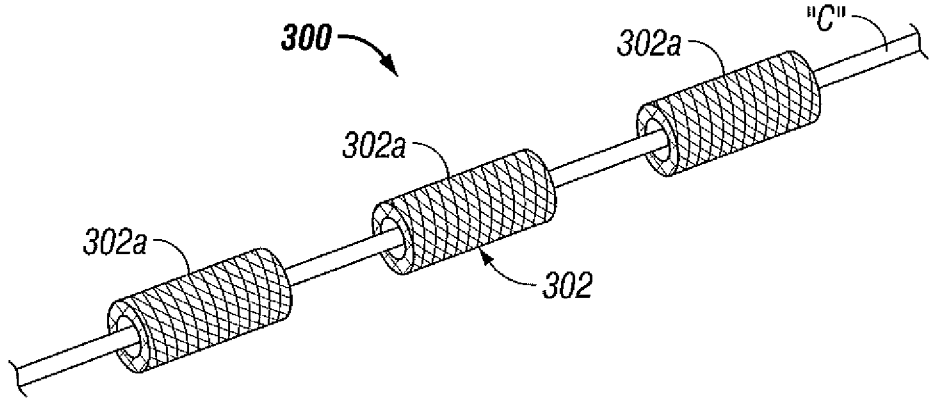
FIG. 14 is a perspective view of a cable stand-off according to yet another embodiment of the present disclosure.
Figure 15:
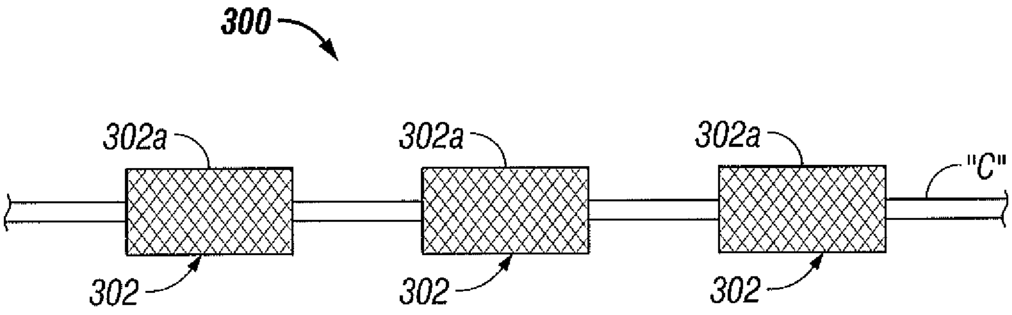
FIG. 15 is a side elevational view of the cable stand-off of FIG. 14.

In an alternative embodiment, as seen in FIGS. 14 and 15, elongated member 302 of cable stand-off 300 is broken into segments 302*a* to only cover portions of conduit "C". The segments of conduit "C", between segments 302*a* of elongated body 302, are uncovered and, as such, the heat produced by energy transmission through conduit "C" of an electrosurgical system may escape through these uncovered segments of conduit "C".

In use, cable stand-off 300 isolates and separates conduit "C" from users and patients, and from other conduits and the like. In this embodiment, airflow may also travel through the cross-sectional area of elongated member 302 and convectively cool conduit "C".

The applications of the cable stand-offs and methods of using the stand-offs discussed above are not limited to electrosurgical systems used for microwave ablation, but may include any number of further electrosurgical applications. Modification of the above-described cable stand-offs and methods for using the same, and variations of aspects of the disclosure that are obvious to those of skill in the art are intended to be within the scope of the claims.

What is claimed is:

1. A cable stand-off, comprising:

an elongated member surrounding at least a portion of a length of at least one energy transmission conduit, at least a portion of the elongated member having a helical shape;

wherein the elongated member is formed of thermally insulative material and includes helical segments of similar diameter longitudinally spaced apart from one another by longitudinally extending bridges, the bridges extending between adjacent helical segments along an outside surface of the at least one energy transmission conduit and at most only partially about the at least one energy transmission conduit.

2. The cable stand-off according to claim 1, wherein the elongated member extends along at least a portion of a length of the conduit.

3. The cable stand-off according to claim 1, wherein the elongated member extends along substantially an entire length of the conduit.

4. A cable stand-off according to claim 1, wherein at least one bridge extends off axis relative to a longitudinal body axis of an adjacent helical section at a point of extension.

5. A cable stand-off according to claim 1, wherein the bridges are configured and dimensioned to permit airflow to the at least one energy transmission conduit between the helical sections.

6. A cable stand-off according to claim 1, wherein each bridge extends from an adjacent helical section in substantially perpendicular manner.

7. A cable stand-off, comprising:

an elongated member surrounding at least a portion of a length of at least one energy transmission conduit, at least a portion of the elongated member having a helical shape;

wherein the elongated member is formed of thermally insulative material and includes helical segments of similar diameter longitudinally spaced apart from one another by longitudinally extending bridges, at least one bridge defining a longitudinal body axis which is substantially parallel to a longitudinal axis of the at least one energy transmission conduit, the longitudinal body axis being disposed at a distance from the longitudinal axis that is less than or equal to a distance from the longitudinal axis defined by a radius of at least one of the helical segments.

8. A cable stand-off, comprising:

an elongated member surrounding at least a portion of a length of at least one energy transmission conduit, at least a portion of the elongated member having a helical shape;

wherein the elongated member is formed of thermally insulative material and includes helical segments of similar diameter longitudinally spaced apart from one another by longitudinally extending bridges, the bridges extending between adjacent helical segments in close proximity to the at least one energy transmission conduit and only partially surrounding the at least one energy transmission conduit.

* * * * *